(12) United States Patent
Macartney et al.

(10) Patent No.: US 7,206,393 B2
(45) Date of Patent: Apr. 17, 2007

(54) APPARATUS AND METHOD FOR PROCESSING INFORMATION FROM A TELEPHONE NETWORK

(75) Inventors: John William Forsyth Macartney, Edinburgh (GB); Richard Beattie, Edinburgh (GB); Neil John McKenzie, Edinburgh (GB); Alistair Kenneth Clement Scott, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 981 days.

(21) Appl. No.: 10/002,554

(22) Filed: Nov. 1, 2001

(65) Prior Publication Data

US 2003/0081755 A1    May 1, 2003

(51) Int. Cl.
*H04M 15/00* (2006.01)
*H04M 3/00* (2006.01)
*H04M 5/00* (2006.01)

(52) U.S. Cl. ...................................... 379/126; 379/243
(58) Field of Classification Search ................ 379/229, 379/243
See application file for complete search history.

(56) References Cited

U.S. PATENT DOCUMENTS

| | | | |
|---|---|---|---|
| 5,333,183 A | 7/1994 | Herbert | 379/112 |
| 6,067,354 A * | 5/2000 | Bauer et al. | 379/201.01 |
| 6,249,572 B1 | 6/2001 | Brockman et al. | 379/133 |
| 6,718,023 B1 * | 4/2004 | Zolotov | 379/133 |
| 6,721,405 B1 * | 4/2004 | Nolting et al. | 379/133 |
| 6,873,617 B1 * | 3/2005 | Karras | 370/389 |
| 2002/0176378 A1 * | 11/2002 | Hamilton et al. | 370/328 |
| 2002/0188712 A1 * | 12/2002 | Caslin et al. | 709/223 |
| 2006/0114832 A1 * | 6/2006 | Hamilton et al. | 370/244 |

FOREIGN PATENT DOCUMENTS

EP        1 227 397 A2     7/2002

OTHER PUBLICATIONS

Fayad, Mohamed and Schmidt, Douglas C., "Object-Oriented Application Frameworks," *Communication of the ACM*, vol. 40, No. 10, Oct. 1997.
"The File Format Conversion Site." <http://web.archive.org/web/20010922111209/http://www.iconv.com> Sep. 22, 2001, The above was made available online as of Sep. 22, 2001, as per United Kingdom Patent Office.

* cited by examiner

*Primary Examiner*—Benny Quoc Tieu

(57) ABSTRACT

A data processing apparatus is coupled to receive call data records from a telephone network (4), for example an SS7 network. The apparatus (1) receives data records of different types having different formats. For each different type of data record, the apparatus (1) has a library (9, 10, 11) of type-specific functions associated with the particular type of data record. The apparatus (1) also has a set (8) of common functions available which contains functions that can be utilized for all types of data records, and for managing the system. Instructions are received by the apparatus (1), which indicate which type or types of data records are to be received and which functions are to be carried out on the data records. The apparatus (1) then creates a function list of the particular functions that are to be carried out before executing the particular functions on the received data records and then storing the processed records in a database (12, 13, 14).

20 Claims, 3 Drawing Sheets

APPARATUS AND METHOD FOR PROCESSING INFORMATION FROM A TELEPHONE NETWORK

FIELD OF THE INVENTION

This invention relates to an apparatus and method for processing information from a telephone network, particularly, though not exclusively, to an apparatus and method for processing call record data from a telephone network having out-of-band signaling.

BACKGROUND OF THE INVENTION

In modern switched telecommunications systems (in particular, modern PSTNs) it has become common practice to provide two related but separate network infrastructures: a bearer or transmission network for carrying end-user voice and data traffic, and a signalling network for controlling the setup and release of bearer channels through the bearer network in accordance with control signals transferred through the signalling network (sometimes known as out-of-band signalling). In practice, such signalling networks comprise high-speed computers interconnected by signalling links; computer programs control the computers to provide a set of operational and signalling functions in accordance with a standardised protocol. One example of such a signalling protocol is the Signalling System No. 7 (SS7), whether as specified by the CCITT, ANSI, ETSI (for GSM), Bellcore or similar body, such as a network being herein referred to as an SS7 network. The CCITT Signalling System Number 7 is specified in Recommendations Q.700–Q.716 CCITT Volume VI-Fascicle VI.7, Geneva 1989, ISBN 92-61-03511-6. SS7 networks are being extensively deployed for control of telephone and other data transmission networks and basically comprise various types of signalling points, namely, Signalling End Points (SEPs), for example an end office or local exchange, and Signalling Transfer Points (STPs) interconnected by signalling links, the SEPs being associated for example with respective Signalling Switching Points (SSPs) of the transmission network, and with Signalling Control Points (SCPs).

As is known in connection with SS7 networks, signaling information is passed over the signaling links. In particular, the signaling information is used by a CDR Builder to generate a Call Detail Record (CDR) which can later be analyzed. For example, the CDRs can be analyzed by reference to a particular customer of a telecommunications company (telco) operating the SS7 system, or certain types of data can be mined from Call Detail Records maintained by telcos in billing databases.

The CDRs may be generated by an apparatus, such as the product developed by Agilent Technologies and known as "acceSS7". This apparatus consists of a CDR Builder, a CDR Agent and a Data Management Component (DMC). The CDR Builder monitors the signaling channels of the SS7 network and generates the CDRs, which are then passed via the CDR Agent to the DMC, where they are processed and correlated to provide a database of the records that can be viewed by interested parties, for example, telcos. An interface is provided to the databases so that the telcos can carry out various processing and analysis functions, for example, checking billing, checking that data is transferred correctly, checking for quality of service, etc. However, if it is required to carry out processing and analysis functions on other types of data records, for example Transaction Detail Records (TDRs), which can also be generated from an SS7 network, this would require a separate data processor programmed with different software, which would be expensive and inefficient to provide and to maintain.

BRIEF SUMMARY OF THE INVENTION

The present invention therefore seeks to provide a method and apparatus for processing information from a telephone network, which overcomes, or at least reduces the above-mentioned problems of the prior art.

Accordingly, in a first aspect, the invention provides an apparatus for processing data records, the apparatus comprising means for receiving data records of a plurality of different types, each type having a different predetermined format, a plurality of type-specific function libraries, each library having functions associated with each of the particular types of data record, means for receiving instructions indicative of the particular type(s) of data records to be received and indicative of which particular functions are to be performed on the data records to be received, means for reading the contents of the type-specific library(ies) associated with the particular type of data records to be received, means for processing received data records according to the particular functions to be performed, and an output for rendering the processed data records.

In a preferred embodiment, at least one database is coupled to the output for storing the processed data records.

According to a second aspect, there is provided a method of processing data records from a telephone network, the method comprising the steps of receiving instructions indicative of which particular type(s) of a plurality of different types of data records are to be processed, receiving instructions indicative of which particular functions are to be performed on the data records to be processed, reading the contents of at least one particular type-specific library of functions associated with the particular type(s) of data records to be processed, receiving data records of the particular type(s), processing the received data records according to the particular functions to be performed, and rendering the processed data records, wherein the first four steps above can be carried out in any order.

Preferably, the particular functions to be performed on the data records to be received include one or more common functions from a set of common functions. The set of common functions preferably includes one or more functions that provide system management functions.

The types of data records can include a Call Detail Record, a Transaction Detail Record, or a Service Detail Record. The data records can originate from, example, a Signaling System No. 7 (SS7) network, a GSM network, an Intelligent Network Application Part (INAP) network or an Internet Protocol (IP) network.

BRIEF DESCRIPTION OF THE DRAWINGS

One embodiment of the invention will now be more fully described, by way of example, with reference to the drawings, of which.

DETAILED DESCRIPTION OF THE DRAWINGS

Figure 1:
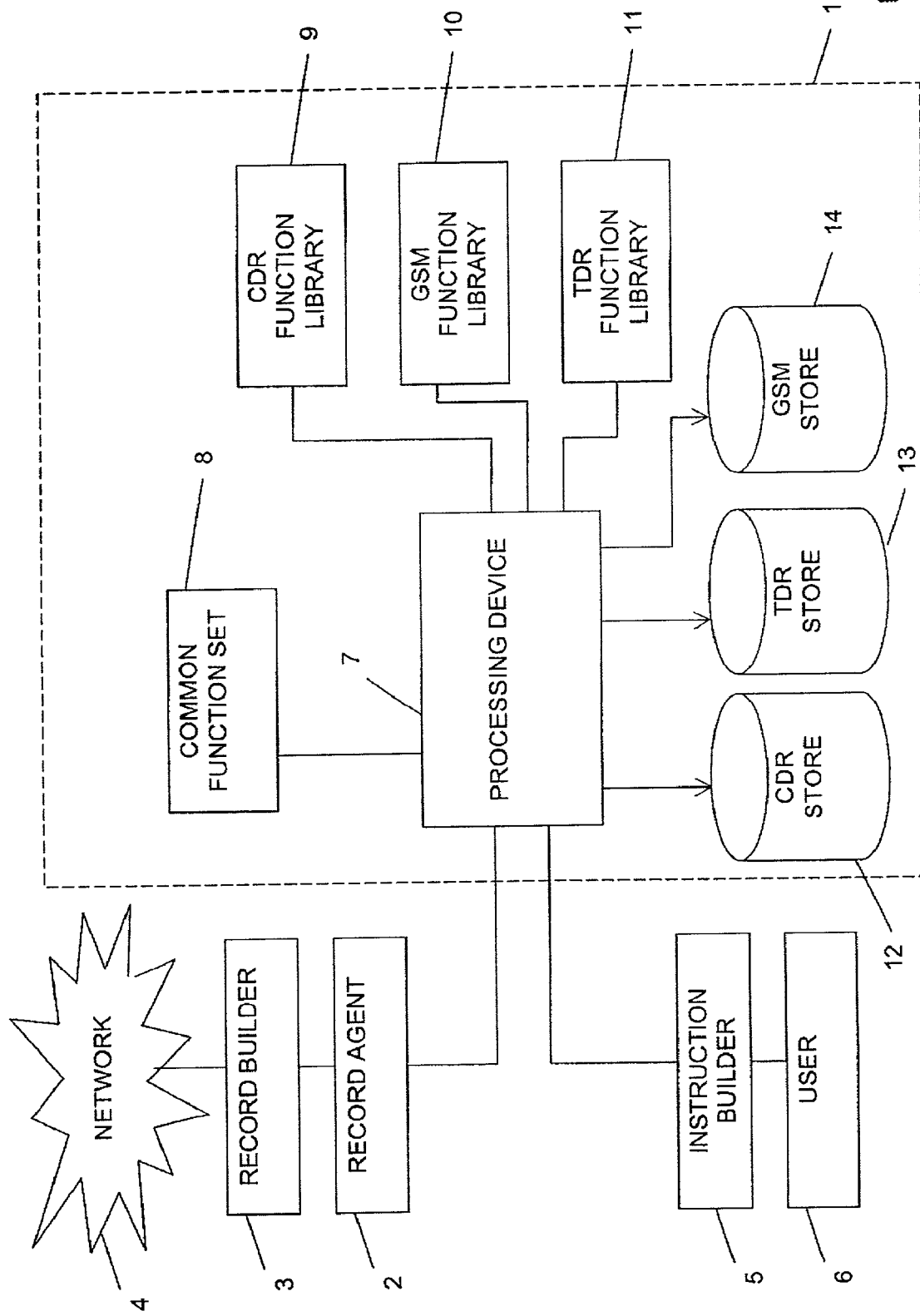
FIG. 1 shows a block diagram of a system incorporating the apparatus according to one embodiment of the present invention.

Thus, FIG. 1 shows a Data Management Component (DMC) 1 according to an embodiment of the present invention. The DMC 1 has a first input for receiving data records from a record agent 2, which receives the call data records from a record builder 3. The record builder 3 monitors a telephone network 4 and generates the call data records from the signaling data on the telephone network. In one example, the telephone network is an SS7 network and the record agent 2 and the record builder 3 are conventional devices, such as those sold by Agilent Technologies and known as "acceSS7".

The DMC 1 also has a second input coupled to an instruction builder 5, which is controlled by a user 6 to generate instructions to be passed to the DMC 1. The two inputs to the DMC are connected to a processing device 7, which also has connections to a set of common functions 8 and to a plurality of function libraries 9–11, and a plurality of record stores 12–14. In essence, the processing device 7 receives instructions at the second input from the user 6 via the instruction builder 5 as to what type of call data records are to be received at the first input from the record agent 2. Depending on what type of call data records are to be received, the processing device 7 reads the contents of the appropriate function libraries 9–11 to a working memory in the processing device 7. The processing device 7 then determines, from instructions received from the user 6 via the instruction builder 5, which of the read functions and which of the functions from the set 8 of common functions are actually to be used in processing the call data records to be received, and then carries out the processing of the call data records when they are received at the first input. The processed call data records are then stored in the appropriate database(s) 12–14. The set 8 of common functions can also include functions that are used for management of the system, for example for managing the database space.

Figure 2:
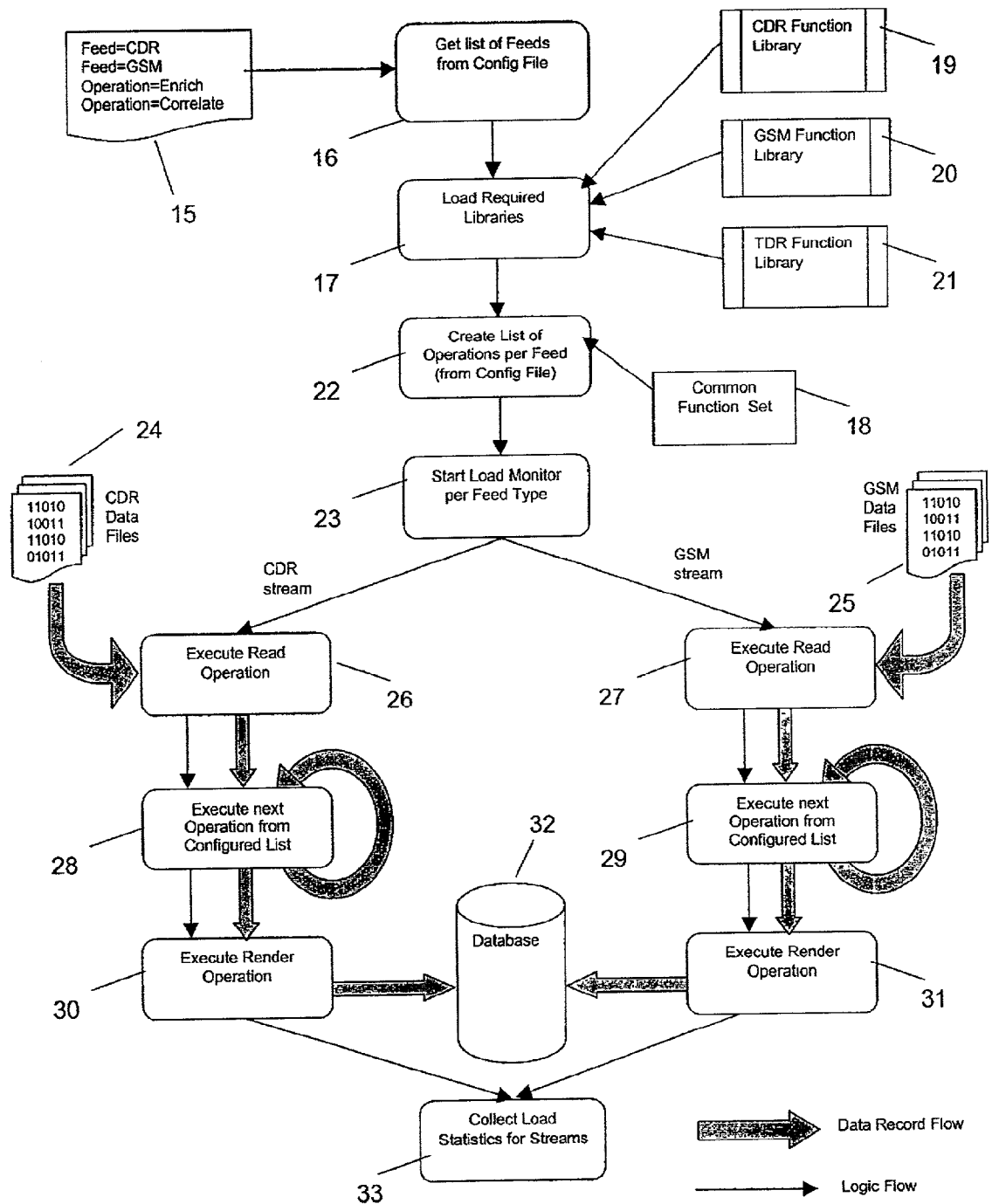
FIG. 2 shows a schematic flow chart of the operation of the apparatus shown in FIG. 1.

Turning now to FIG. 2, the operation of the DMC 1 will be more fully described. The types of record to be used in a load (feed) operation and the operations to be performed within that feed are specified in a configuration file 15 that is generated by the user using the instruction builder, as described above. When the DMC is scheduled to run it reads the configuration file 15. At this early stage in the load the DMC determines, as shown at step 16, from the configuration file 15, which types of feeds (types of data records, such as CDR, TDR, GSM) are to be loaded. The DMC then reads (step 17) the required Type-Specific shared libraries chosen from all the available Type-Specific Libraries 19, 20, 21 which contain the functions for each type of record. In this example, the configuration file specifies that the types of record that are to be received are CDR and GSM, which is a type of TDR record. Thus, once the CDR and GSM function libraries 19, 20 have been loaded into the memory image of the DMC, the DMC obtains further information from the configuration file as to which operations are to be performed on each record in the relevant feeds. For example a CDR operation list may include Check, Translate, Complete Telephone Numbers, Correlate, Output. This information would typically be provided as a list for each feed in the configuration file. Other functions to be performed on the records to be received may be read from a set of Common Functions 18.

After the list of operations to be performed on each of the record types is created (step 22), the DMC then starts a load monitor for each feed to be loaded (step 23). This load monitor effectively controls the load for that feed. The load monitor starts a number of load managers depending on the volume of data to be loaded, and on the number of different types of record to be processed, and each of these will cycle through the list of operations to be performed and execute each one on every record. Thus, in the present example, a CDR processing stream and a GSM processing stream are started, with one or more load monitors for each stream.

For each stream, the data record files for the particular type of record are received (CDR files 24 and GSM files 25), and the operations to be performed within a feed are executed. In a typical scenario, the first operation 26, 27 to be carried out is to read a record from file and the last operation 28, 29 to be performed is to send (or otherwise render) the record to be loaded into an appropriate database 32, of which only one is shown. Other operations, which are shown as step 30, 31, may vary from translating particular fields contained in a record to enriching records with data retrieved from a reference table in the database. Looking up another table in the database and enriching a record is an example of how a feed might use one of the core services of the DMC, in this instance Reference Data Management.

Once all operations have been performed for all feeds, statistics may be collected (step 33), for example the number of records loaded and the time taken for the load.

Figure 3:
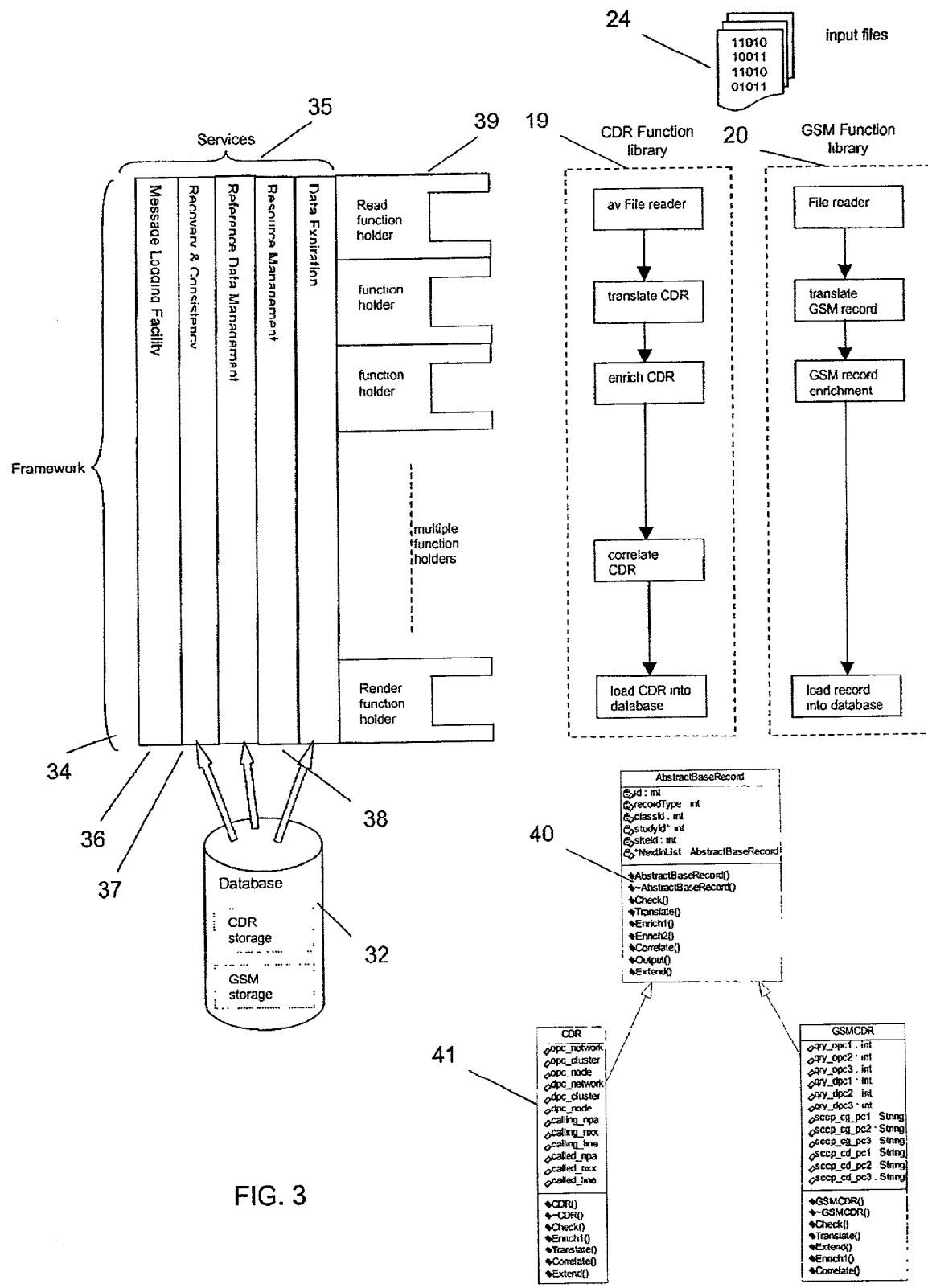
FIG. 3 shows schematically a software implementation of the operation of the apparatus of FIG. 1.

As shown in FIG. 3, the DMC provides a software framework 34 for generic processing of data records and a strategy for using the type-specific function libraries 19, 20 to implement functionality specific to a type of input record 24.

The framework 34 is a skeletal structure of software that is not tied to any specific format or type of record to be processed. The framework 34 provides a number of core common functions 35 (services) that may be used by any feed of data that is configured to be processed and loaded. Examples of these services 35 include a Message Logging facility 36, a Reference Data Management facility 37 and a Resource Management facility 38. These are all facilities that would be required in any typical scenario of processing records from a telecom network.

In addition to these services the framework provides "function holders" 39 which are placeholders or interfaces for functions written by application developers. These functions each perform an operation on the data records and collections of functions for one type record (for example CDR) are collated in the type-specific function library, although this is not the only method possible. Therefore if a customer requires that a DMC processes only CDRs, the software used would be the DMC Framework and a CDR shared library.

The software architecture also allows for multiple types of record to be loaded at one time, thus forming a number of parallel load streams. For example if a customer requires that both CDRs and GSM CDRs be loaded, they would use the DMC Framework 34, a type-specific library for CDRs 19 and another type-specific library for GSM CDRs 20. The type-specific libraries have a number of type-specific functions, as described above and as shown in FIG. 3, for example, functions for reading, translating, enriching, correlating and loading into a database.

In order for the framework 34 to be able to call separate functions for each defined operation it needs to be able to pass records through the framework so each operation can be invoked on each record. The DMC is able to "pass" records of multiple data formats through the framework by using the object oriented software engineering techniques of inheritance and polymorphism. The fields typically found in any type of record produced from signaling information on a telecommunication network are used to form a generalized record type known in the DMC as an Abstract Base Record 40. If a new type of data record is to be processed the Abstract Base Record 40 is specialized, that is a new record type, for example a CDR type 41, is derived from the Abstract Base Record 40 and it inherits the members and operations of this base type. Also, any virtual functions declared within the Abstract Base Record type can be defined within the derived type. For example Translate may be a virtual function of the Abstract Base Record but each record type derived may use its own definition.

This generalization of all possible record types to a single base type means that the framework simply has to be able to handle records of one type, that is the Abstract Base Record. Due to the nature of object oriented software construction, this means that the framework has the ability to process records of any format on the condition they are derived from the base type. This enables the DMC architecture to be flexible and extensible.

A further feature of the framework is the capability to buffer records during a particular operation. Buffering within the framework allows multiple records to be collected at one point so an operation can be provided with a group of data records rather than just individual records. This is essential for operations such as the correlation of records where it may be necessary to buffer records for a large period of time and then perform the correlation operation of tagging records related to the same call, transaction or service.

The flexibility of the above described embodiment of the invention contrasts with the known types of call data processor, in which the software is written specifically to process call data records (CDRs) and to load them into a database. This processing include several operations including translating the CDRs from compressed binary format on disk to a format "loadable" into the database. As well as processing records, the system was responsible for managing the tablespace usage in the database including estimating how much space each load required depending on the number of CDRs. Also, a facility was provided to translate certain fields in a CDR. Each of these facilities was written based on the fact that the system was used only for processing and loading CDRs and it was not possible to load or process any other sort of record without rewriting large amounts of the program source code.

It will be appreciated that although only one particular embodiment of the invention has been described in detail, various modifications and improvements can be made by a person skilled in the art without departing from the scope of the present invention. For example, alternative embodiments of the invention can be implemented as a computer program product for use with a computer system, the computer program product being, for example, a series of computer instructions stored on a tangible data recording medium, such as a diskette, CD-ROM, ROM, or fixed disk. The computer program can be transferred from the recording medium to a computer via a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

The invention claimed is:

1. An apparatus for processing data records, the apparatus comprising:
   a receiver that receives data records of a plurality of different types, each type having a different predetermined format, the data records comprising one or more selected from the group consisting of Call Detail Records, Transaction Detail Records and Service Detail Records;
   a plurality of type-specific function libraries, each library having functions that operate on each of the particular types of data record;
   a receiver that receives instructions indicative of the particular type(s) of data records to be received and indicative of which particular functions are to be performed on the data records to be received;
   a reader that reads contents of the type-specific library (ies) that operate on the particular type of data records to be received;
   a module that selects which functions from the contents of the type-specific function library(ies) are to be utilized in processing the received data records;
   a processor that processes received data records according to the particular functions to be performed; and
   an output for rendering the processed data records.

2. An apparatus for processing data records according to claim 1, further comprising at least one database coupled to the output for storing the processed data records.

3. An apparatus for processing data records according to claim 1, further comprising a set of common functions, wherein the particular functions to be performed on the data records to be received can include one or more common functions from the set of common functions.

4. An apparatus for processing data records according to claim 3, wherein the set of common functions includes one or more functions that provide system management functions operative on the apparatus.

5. An apparatus for processing data records according to claim 3, further comprising a module that determines which functions from the set of common functions are to be utilized in processing the received data records.

6. An apparatus for processing data records according to claim 1, wherein the at least one of the data records originates from a Signaling System No. 7 network.

7. An apparatus for processing data records according to claim 1, wherein the at least one of the data records originates from a GSM network.

8. An apparatus for processing data records according to claim 1, wherein the at least one of the data records originates from an Intelligent Network Application Part (INAP) network.

9. An apparatus for processing data records according to claim 1, wherein the at least one of the data records originates from an Internet Protocol (IP) network.

10. A method of processing data records from a telephone network, the method comprising:
   (a) receiving instructions indicative of which particular type(s) of a plurality of different types of data records are to be processed, the data records comprising one or more selected from the group consisting of Call Detail Records, Transaction Detail Records and Service Detail Records;
   (b) receiving instructions indicative of which particular functions are to be performed on the data records to be processed;
   (c) reading the contents of at least one particular type-specific library of functions that operate on the particular type(s) of data records to be processed;
   (d) receiving data records of the particular type(s);
   (e) selecting which functions from the contents of the type-specific function library(ies) are to be utilized in processing the received data records;

(f) processing the received data records according to the particular functions to be performed; and (g) rendering the processed data records, wherein (a) through (d) above can be carried out in any order.

11. A method of processing data records according to claim 10, further comprising storing the processed data records in at least one database.

12. A method of processing data records according to claim 10, wherein the particular functions to be performed on the data records to be received include one or more common functions from a set of common functions.

13. A method of processing data records according to claim 12, wherein the set of common functions includes one or more functions that provide system management functions.

14. A method of processing data records according to claim 12, further comprising determining which functions from the set of common functions are to be utilized in processing the received data records.

15. A method of processing data records according to claim 10, wherein at least one of the data records originates from a Signaling System No. 7 network.

16. A method of processing data records according to claim 10, wherein at least one of the data records originates from a GSM network.

17. A method of processing data records according to claim 10, wherein at least one of the data records originates from an Intelligent Network Application Part (INAP) network.

18. A method of processing data records according to claim 10, wherein at least one of the data records originates from an Internet Protocol (IP) network.

19. A computer readable medium, comprising a program tangibly embodied thereon, for controlling a processor to execute a procedure to implement the method of claim 10.

20. A programmed computer, comprising:

a processor; and a memory having a program for controlling the processor to execute a procedure to implement the method of claim 10.

* * * * *

UNITED STATES PATENT AND TRADEMARK OFFICE
CERTIFICATE OF CORRECTION

| | | |
|---|---|---|
| PATENT NO. | : 7,206,393 B2 | Page 1 of 1 |
| APPLICATION NO. | : 10/002554 | |
| DATED | : April 17, 2007 | |
| INVENTOR(S) | : Macartney et al. | |

It is certified that error appears in the above-identified patent and that said Letters Patent is hereby corrected as shown below:

Title page, item (57), under "Abstract", in column 2, line 5, delete "(9, 10, 11 )" and insert -- (9, 10, 11) --, therefor.

Signed and Sealed this

Eighteenth Day of September, 2007

JON W. DUDAS
*Director of the United States Patent and Trademark Office*